US008829759B2

(12) United States Patent
Schwery et al.

(10) Patent No.: US 8,829,759 B2
(45) Date of Patent: Sep. 9, 2014

(54) ROTATING ELECTRIC MACHINE WITH ROTOR INCLUDING BOLTS

(75) Inventors: Alexander Schwery, Kuettigen (CH); Serdar Cifyildiz, Winterthur (CH); Hanspeter Walser, Laupersdorf (CH); Ricardo Okai, Fislisbach (CH)

(73) Assignee: Alstom Renewable Technologies, Grenoble (FR)

( * ) Notice: Subject to any disclaimer, the term of this patent is extended or adjusted under 35 U.S.C. 154(b) by 28 days.

(21) Appl. No.: 13/276,345

(22) Filed: Oct. 19, 2011

(65) Prior Publication Data

US 2012/0112601 A1    May 10, 2012

Related U.S. Application Data

(63) Continuation of application No. PCT/EP2010/055153, filed on Apr. 20, 2010.

(30) Foreign Application Priority Data

Apr. 24, 2009   (DE) .......................... 10 2009 018 549
Aug. 20, 2009   (DE) .......................... 10 2009 037 991

(51) Int. Cl.
   *H02K 1/06*     (2006.01)
   *H02K 17/00*    (2006.01)
   *H02K 1/26*     (2006.01)

(52) U.S. Cl.
   CPC ..................................... *H02K 1/26* (2013.01)
   USPC ...... 310/216.058; 310/216.004; 310/216.008; 310/216.009

(58) Field of Classification Search
   CPC ................................. H02K 1/06; H02K 17/00
   USPC .................... 310/216.004, 216.007–216.009, 310/216.011, 260, 270, 216.058; 411/546
   See application file for complete search history.

(56) References Cited

U.S. PATENT DOCUMENTS

| 725,773 A | 4/1903 | Reist |
| 2,519,219 A | 8/1950 | Baudry et al. |

(Continued)

FOREIGN PATENT DOCUMENTS

| DE | 701612 C | 1/1941 |
| DE | 1090749 B | 10/1960 |

(Continued)

OTHER PUBLICATIONS

Machine Translation JP11266555 (1999).*

(Continued)

*Primary Examiner* — Tran Nguyen
*Assistant Examiner* — Jose Gonzalez Quinone
(74) *Attorney, Agent, or Firm* — Buchanan Ingersoll & Rooney PC

(57) ABSTRACT

A rotating electrical machine includes a rotor configured to rotate about an axis. The rotor includes a rotor lamination stack having a plurality of sheets pressed into a composite assembly in an axial direction and being radially divided into an inner mechanical part and an outer electrical part. A rotor winding is disposed in the electrical part of the rotor lamination stack. A stator is concentrically surrounding the rotor. A plurality of shear bolts is disposed in the mechanical part and configured to reach through the rotor lamination stack. A plurality of further bolts is disposed in the electrical part, the plurality of shear bolts and a plurality of further bolts being configured to press the plurality of sheets in the axial direction.

12 Claims, 3 Drawing Sheets

(56) References Cited

U.S. PATENT DOCUMENTS

| | | | |
|---|---|---|---|
| 3,123,729 | A | 3/1964 | Fagel |
| 3,335,308 | A | 8/1967 | Robinson |
| 4,489,249 | A | 12/1984 | Olivier |
| 4,942,324 | A | 7/1990 | Ooyama et al. |
| 5,068,564 | A | 11/1991 | Frank |
| 5,473,213 | A | 12/1995 | Kahle, Sr. |
| 5,635,785 | A * | 6/1997 | Schwanda et al. ............ 310/270 |
| 5,816,761 | A * | 10/1998 | Cassatt et al. .................. 411/34 |
| 6,157,109 | A | 12/2000 | Schiferl et al. |
| 6,789,993 | B2 * | 9/2004 | Ozawa et al. ................ 411/546 |

FOREIGN PATENT DOCUMENTS

| | | |
|---|---|---|
| DE | 1124592 B | 3/1962 |
| DE | 1141020 B | 12/1962 |
| DE | 1161637 B | 1/1964 |
| DE | 1178143 B | 9/1964 |
| DE | 1184411 B | 12/1964 |
| DE | 1196779 B | 7/1965 |
| DE | 1563007 A1 | 4/1970 |
| DE | 3907860 A1 | 12/1989 |
| DE | 19513457 A1 | 10/1996 |
| DE | 102008016890 A1 | 4/2009 |
| DE | 102007000668 A1 | 5/2009 |
| EP | 414129 A2 * | 2/1991 |
| EP | 0414129 A2 | 2/1991 |
| GB | 981727 B | 1/1965 |
| JP | 57138830 A | 8/1982 |
| JP | 60035931 A | 2/1985 |
| JP | 61058439 A | 3/1986 |
| JP | 11266555 A * | 9/1999 |
| SU | 1246248 A * | 7/1986 |
| WO | WO 801444 A1 | 7/1980 |

OTHER PUBLICATIONS

European Patent Office, International Search Report in International Patent Application No. PCT/EP2010/056055 (Jul. 20, 2010).

European Patent Office, International Search Report in Internatlonal Patent Application No. PCT/EP2010/055153 (Jul. 26, 2010).

German Search Report for DE 10 2009 037 987.8, dated Aug. 20, 2009.

* cited by examiner

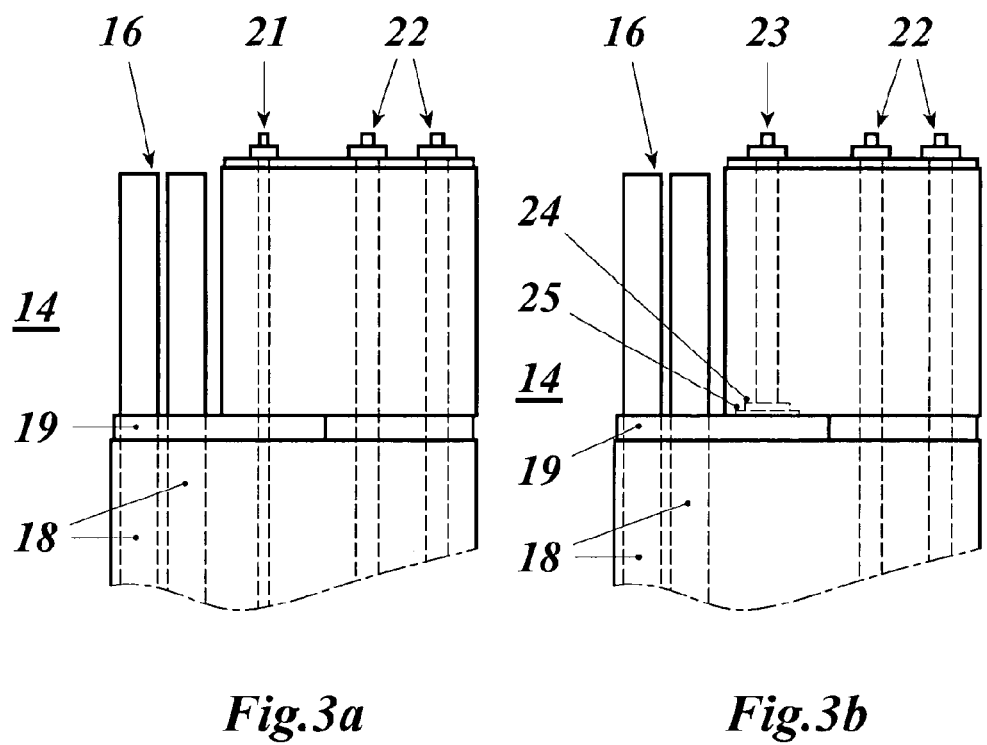
*Fig.3a*          *Fig.3b*
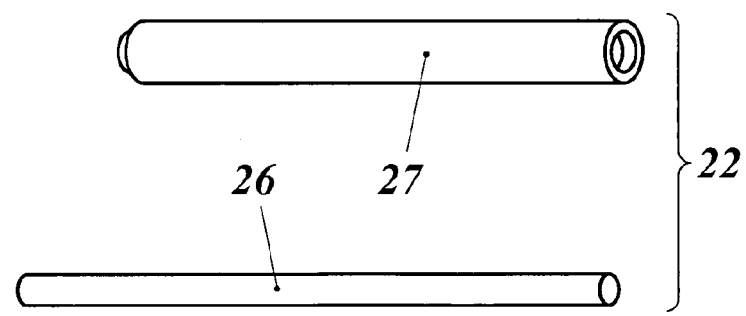
*Fig.4*

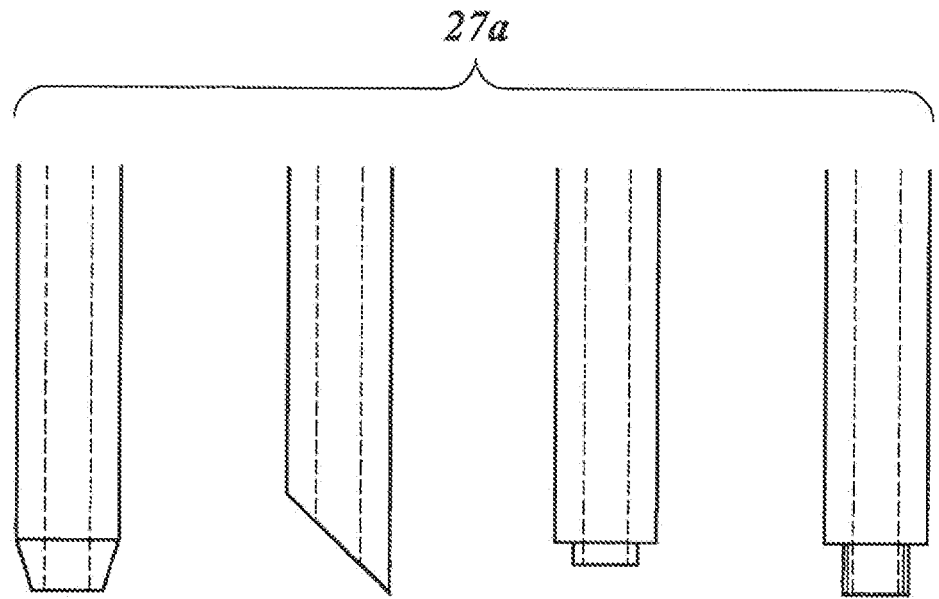
*Fig.5a*  *Fig.5b*  *Fig.5c*  *Fig.5d*
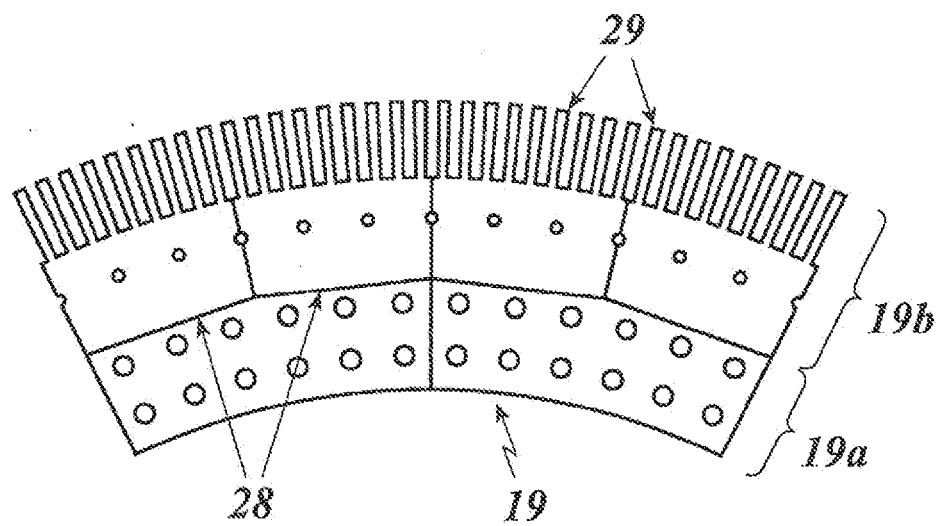
*Fig.6*

ROTATING ELECTRIC MACHINE WITH ROTOR INCLUDING BOLTS

CROSS REFERENCE TO PRIOR APPLICATIONS

This application is a continuation of International Patent Application No. PCT/EP2010/055153, filed on Apr. 20, 2010, which claims priority to German Patent Application Nos. DE 10 2009 018 549.6, filed on Apr. 24, 2009, and DE 10 2009 037 991.6, filed on Aug. 20, 2009. The entire disclosure of the applications is incorporated by reference herein.

FIELD

The present invention relates to the field of electrical power generation and to a rotating electrical machine.

BACKGROUND

Double-fed asynchronous machines in the power range from 20 MVA to over 500 MVA can be used for variable-speed energy production. These machines are distinguished by a distributed three-phase winding on the rotor. The rotor winding consists of individual bars which are embedded in slots in the rotor laminations. The individual bars are connected in the winding head to form a winding. The currents are fed in by at least three collector rings which are fixed to the shaft at the end of the machine. A section of such an asynchronous machine is reproduced in highly simplified form in FIG. 1. The asynchronous machine 10 shown in FIG. 1 has a machine axis 13. Rotatably about this axis 13 is a central body 11 with a shaft, on which the collector rings 12 are arranged. The rotor lamination stack 14, to which an auxiliary rim 20 is connected below a winding head 16 of the rotor winding, is arranged around the central body 11. The rotor lamination stack 14 is encompassed concentrically by a stator lamination stack 15 in which is mounted a stator winding, a stator winding head 17 of which projects outwards at the end of the body. The rotor lamination stack 14 is shown enlarged in section in FIG. 2.

As the rotors of double-fed asynchronous machines carry a rotor winding 18, said winding must be safeguarded against the centrifugal forces which occur. On the one hand, the rotor lamination stack serves to absorb these forces and at the same time defines the path for the magnetic flux. The auxiliary rim 20 serves to absorb the centrifugal forces which act on the rotor winding head 16. The auxiliary rim 20, like the rotor lamination stack 14, consists of laminated sheets which are pressed in the axial direction to form a composite assembly. In doing so, a pressing plate 19 which distributes the compression force applied by the bolts 21, 22 to the sheets of the rotor lamination stack can be used (see, for example, DE-A1-195 13 457 or DE-A1-10 2007 000 668).

Different requirements are imposed on the rotor lamination stack 14. The principle of a subdivision into an electrical part 14a and a mechanical part 14b is shown in FIG. 2. On the one hand, there must be sufficient axial force between the layers of sheets in the teeth to guarantee the uniformity of the body. In order to avoid vibrations, the layers must not come loose, as relative movements between the teeth and the rotor winding 18 could damage the insulation. On the other hand, the pressure must not be too high in order to avoid damage to the insulation layers between the individual sheets, as such damage would lead to increased losses. The axial force must be higher in the mechanical part 14b of the rim than in the electrical part 14a in order to obtain a certain frictional force between the sheets.

SUMMARY OF THE INVENTION

In an embodiment, the present invention provides a rotating electrical machine including a rotor configured to rotate about an axis. The rotor includes a rotor lamination stack having a plurality of sheets pressed into a composite assembly in an axial direction and being radially divided into an inner mechanical part and an outer electrical part. A rotor winding is disposed in the electrical part of the rotor lamination stack. A stator is concentrically surrounding the rotor. A plurality of shear bolts is disposed in the mechanical part and configured to reach through the rotor lamination stack. A plurality of further bolts is disposed in the electrical part, the plurality of shear bolts and a plurality of further bolts being configured to press the plurality of sheets in the axial direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 shows in two part FIGS. 3(a) and 3(b) two different types of bolt for the electrical part of the rotor lamination stack;

FIG. 4 shows the principle construction of a multi-part shear bolt;

FIG. 5 shows in different part FIGS. 5(a) to 5(d) different types of connecting means for the concentric alignment of the subsections of a shear bolt with subdivided tube; and FIG. 6 shows in plan view in the axial direction a sector of a pressing plate for clamping the rotor lamination stack according to a further exemplary embodiment of the invention.

DETAILED DESCRIPTION

In am embodiment, the present invention relates to a double-fed asynchronous machine in the power range between 20 MVA and above 500 MVA.

In an embodiment, an electrical machine of the kind mentioned in the introduction is provided such that the different requirements on the clamping of the rotor lamination stack in the different regions can be considerably better fulfilled.

In an embodiment, the rotor lamination stack (14) is pressed in the mechanical part by means of shear bolts axially reaching through said rotor lamination stack, and in the electrical part by means of further bolts.

According to an embodiment of the invention, the further bolts can be designed as tensioning bolts passing through the rotor lamination stack in the axial direction.

Another embodiment of the invention is distinguished in that a pressing plate is provided at each end of the body in order to distribute the axial compression force on the rotor lamination stack, and that the further bolts are designed as forcing bolts which press against the pressing plates from the outside.

In an embodiment, when an auxiliary rim for supporting the rotor winding head is arranged particularly outside the pressing plates, the forcing bolts can with advantage be accommodated in the auxiliary rim.

A further embodiment of the invention is characterized in that at least some of the shear bolts are designed as solid bolts.

However, it is also conceivable and, with regard to the use of different materials, of advantage, when at least some of the shear bolts are designed as multi-part bolts which comprise an outer tube and a central tensioning bolt running through the tube.

In particular, in this case, the outer tube can be subdivided in the axial direction into a plurality of subsections in order to be able to better comply with the required tolerances and to simplify the erection and assembly process of the machine.

In doing so, it is of advantage when the subsections are equipped at each end with matching means for concentric alignment of the subsections with one another.

Another embodiment of the invention is distinguished in that the pressing plate is subdivided radially into a separate inner pressing plate and a separate outer pressing plate corresponding to the radial subdivision of the rotor lamination stack, and that the inner and outer pressing plates are releasably connected to one another.

An improvement of this embodiment is characterized in that the outer pressing plate is subdivided along the circumference into individual similar circumferential sections, that the circumferential sections of the outer pressing plate each abut the inner pressing plate with a straight tilting edge, and that the circumferential sections of the outer pressing plate are each suspended in the inner pressing plate by means of hammer claws.

Figure 1:
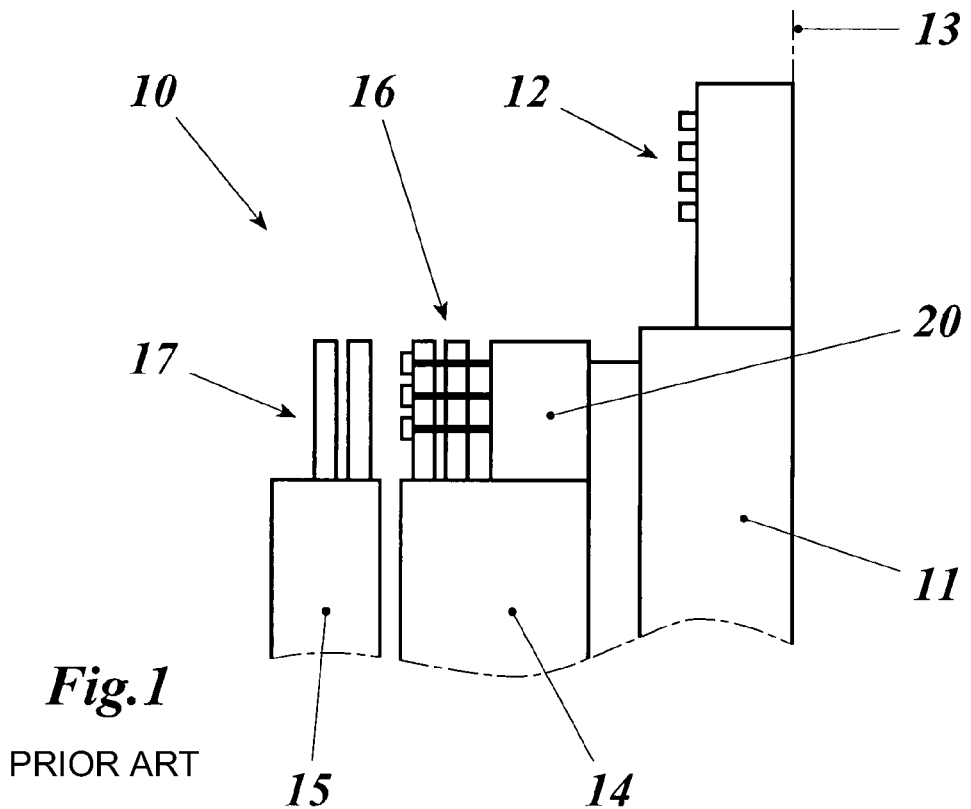
FIG. 1 shows in a simplified representation a section of an asynchronous machine such as is suitable for the application of the invention.
Figure 2:
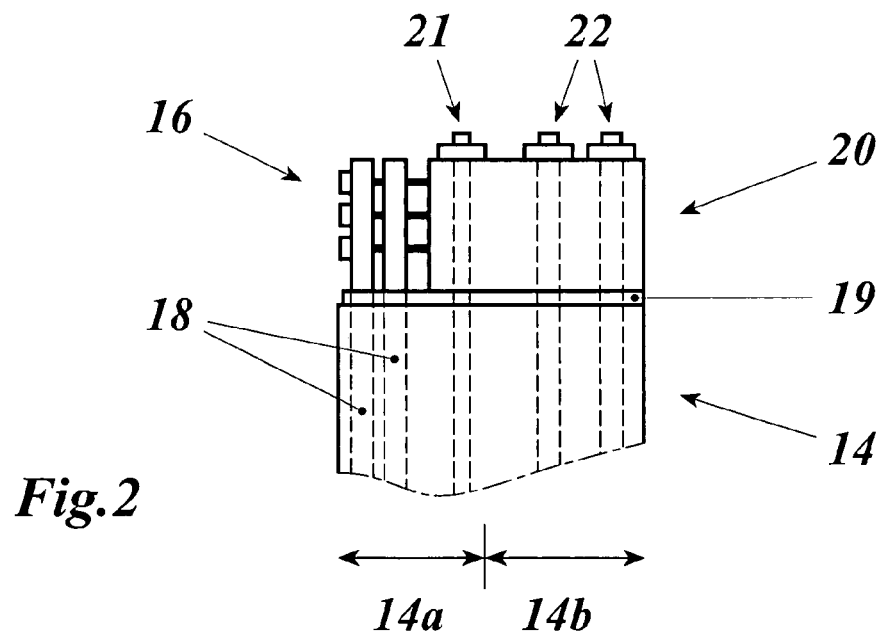
FIG. 2 shows in an enlarged section the construction of the rotor lamination stack of the machine from FIG. 1 including a pressing plate which is used for clamping the rotor lamination stack with different bolts according to an exemplary embodiment of the invention.

According to FIG. 2, different types of bolt, namely shear bolts 22 and tensioning bolts 21, are used for axially clamping the rotor lamination stack 14.

The shear and tensioning bolts 22 and 21 respectively are used to build up the required pressure in the rotor lamination stack 14. Two basic principles can be used to build up the pressure in the tooth region or electrical part 14a:

Tensioning Bolts:

The tensioning bolts (21 in FIG. 2 and FIG. 3(a)) run over the whole axial length of the rotor lamination stack 14. As the tensioning bolts 21 are located in the magnetically active part (high magnetic induction) of the lamination stack, they must be electrically insulated. However, in order to prevent mechanical stressing of the insulation, these bolts must not be subjected to shear. The pressure on the pressing plate 19 and therefore the pressure in the teeth (see 29 in FIG. 6) can be "adjusted" by means of the tension in the tensioning bolts 21.

Forcing Bolts in the Auxiliary Rim 20:

Forcing bolts 23 in the auxiliary rim 20 can be used instead of the penetrating tensioning bolts 21 (see FIG. 3 (b)). If a forcing bolt 23 in the auxiliary rim 20 is used, the pressure is transmitted onto the tooth region of the rotor lamination stack via a bolt which is located in the auxiliary rim 20. Here, a forcing plate 25 and a nut 24 are situated between forcing bolt 23 and pressing plate 19. The pressure on the pressing plate 19 and therefore on the teeth can be "adjusted" by the depth to which the forcing bolt 23 is screwed into the nut 24.

On the other hand, the shear bolts 22 undertake two tasks: Firstly, they serve to apply the axial force in the mechanical part 14b of the rotor lamination stack 14. Secondly, they must absorb the shear forces which occur between the sheets of the rotor lamination stack 14. For this reason, the shear bolts 22 cannot be insulated and are consequently located at the inner edge in the magnetically weakly used section of the mechanical part 14b.

The shear forces to be transmitted define the material properties and the (outer) bolt diameter of the shear bolts 22. The axial force in the rotor lamination stack 14 is adjusted by the extension of the bolts. In order to be able to guarantee sufficient residual pressure in the rotor lamination stack 14 in spite of setting phenomena of the rotor lamination stack 14, a certain minimum extension is required in the initial state. This can lead to very high pressures in the case of large bolt diameters.

It is therefore advantageous, according to FIG. 4, to use thick-walled tubes 27 together with central tensioning bolts 26 which run in the bore of the tubes 27 instead of solid bolts. The shear forces to be transmitted define the material properties and the tube diameters. At the same time, the shear forces are absorbed by the tubes 27. The pressure to be achieved on the rotor lamination stack is adjusted by the extension of the central tensioning bolts 26. As the diameter of these rods is smaller than in the case of solid bolts, sufficiently large pressures can be achieved for the same extension.

A certain disadvantage of the solution with tubes 27 and central tensioning bolts 26 consists in the high demand on the accuracy of the bores in the tubes 27. Particularly in the case of longer machines, it is very laborious to achieve the tight tolerances required. However, the same idea can also be realized with axially divided tubes 27. Here, the tubes 27 are divided into a plurality of subsections (27a in FIG. 5) which can be manufactured with the required tolerances considerably more easily. Furthermore, this embodiment simplifies the erection and assembly process of the machine. To enable the individual subsections 27a to be concentrically aligned with one another in a simple manner, according to FIG. 5, the ends can be provided with threads (FIG. 5(d)), designed with an offset (FIG. 5(c)) or chamfered (FIG. 5(b)), or conically tapering (FIG. 5(a)), wherein a combination of these solutions is also possible.

In addition to the design of the bolts, the conflicting demands on the electrical and mechanical part 14a and 14b of the stator lamination stack 14 can be even better achieved by a radially divided pressing plate 19. FIG. 6 shows a schematic representation of an exemplary embodiment of the pressing plate 19 in plan view in the axial direction. The pressing plate 19 is subdivided in both the radial direction and partially in the circumferential direction into a separate inner pressing plate 19a and a separate outer pressing plate 19b. For its part, the outer pressing plate 19b is subdivided in the circumferential direction into individual circumferential sections. As a result of the subdivision of the pressing plate 19 into an inner and a plurality of outer parts 19a and 19b following the division of the rotor lamination stack 14 into a mechanical part 14b and an electrical part 14a, the type of axial clamping for the different regions of the rotor lamination stack 14 can be optimized separately.

In order to be able to achieve a specific tilting of the outer pressing plate 19b, the division between the outer and inner pressing plate 19a and 19b respectively must have a tilting edge 28 which is straight in sections. As a result of the radial division of the pressing plate 19, it is possible to achieve different pressures in the electrical and mechanical part 14a and 14b respectively of the rotor lamination stack 14.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

List Of Reference Numerals 10 asynchronous machine
    11 central body (with shaft)
    12 slip ring
    13 axis
    14 rotor lamination stack
    14a electrical part
    14b mechanical part
    15 stator lamination stack
    16 rotor winding head
    17 stator winding head
    18 rotor winding
    19 pressing plate
    19a inner pressing plate
    19b outer pressing plate
    20 auxiliary rim
    21 tensioning bolt
    22 shear bolt
    23 forcing bolt
    24 nut
    25 forcing plate
    26 central tensioning bolt
    27 tube
    27a subsection
    28 tilting edge
    29 tooth

The invention claimed is:

1. A rotating electrical machine comprising:
a rotor configured to rotate about an axis and including a rotor lamination stack having a plurality of sheets pressed into a composite assembly in an axial direction and being radially divided into an inner mechanical part and an outer electrical part;
a rotor winding disposed in the electrical part of the rotor lamination stack;
a stator concentrically surrounding the rotor;
a plurality of shear bolts disposed in the mechanical part and configured to reach through the rotor lamination stack;
a plurality of further bolts disposed in the electrical part, the plurality of shear bolts and plurality of further bolts being configured to press the plurality of sheets in the axial direction; and
an inner pressing plate and an outer pressing plate corresponding to the radial division of the rotor lamination stack, the inner and outer pressing plates being separate and a division between the inner pressing plate and outer pressing plate including a tilting edge.

2. The rotating electric machine as recited in claim 1, wherein the rotating electric machine is a double-fed asynchronous machine having a performance range from 20 MVA to over 500 MVA.

3. The rotating electrical machine as recited in claim 1, wherein the plurality of further bolts include tensioning bolts configured to pass through the rotor lamination stack in the axial direction.

4. The rotating electrical machine as recited in claim 1, further comprising a pressing plate disposed on each axial side of the rotor lamination stack so as to distribute an axial compression force on the rotor lamination stack, and wherein the plurality of further bolts includes forcing bolts configured to press against the pressing plates from an outside of the pressing plates.

5. The rotating electrical machine as recited in claim 4, further comprising an auxiliary rim configured to support a rotor winding head of the rotor winding disposed on the outside of each of the pressing plates, wherein the plurality of forcing bolts are disposed in the auxiliary rim.

6. The rotating electrical machine as recited in claim 1, wherein at least some of the plurality of shear bolts include solid bolts.

7. The rotating electrical machine as recited in claim 1, wherein at least some of the shear bolts are multi-part bolts including an outer tube and a central tensioning bolt disposed in the outer tube.

8. The rotating electrical machine as recited in claim 7, wherein the outer tube is subdivided in the axial direction into a plurality of outer tube subsections.

9. The rotating electrical machine as recited in claim 8, wherein each of the plurality of outer tube subsections include an end configured to concentrically align the outer tube subsections with one another.

10. The rotating electrical machine as recited in claim 1, wherein the inner and outer pressing plates are releasably connected to one another.

11. The rotating electrical machine as recited in claim 9, wherein the outer pressing plate is divided along a circumference of a respective pressing plate into a plurality of individual similar circumferential parts each including a straight tilting edge abutting the inner pressing plate.

12. A rotating electrical machine comprising:
a rotor configured to rotate about an axis and including a rotor lamination stack having a plurality of sheets pressed into a composite assembly in an axial direction and being radially divided into an inner mechanical part and an outer electrical part;
a rotor winding disposed in the electrical part of the rotor lamination stack;
a stator concentrically surrounding the rotor;
a plurality of shear bolts disposed in the mechanical part and configured to reach through the rotor lamination stack, each shear bolt being a multi-part bolt including an outer tube and a central tensioning bolt disposed in the outer tube, the outer tube being configured to absorb the shear forces acting on the rotor laminate stack; and
a plurality of further bolts disposed in the electrical part, wherein the plurality of shear bolts and plurality of further bolts are configured to press the plurality of sheets in the axial direction.

\* \* \* \* \*